US010275206B2

(12) United States Patent
Borthwick et al.

(10) Patent No.: US 10,275,206 B2
(45) Date of Patent: Apr. 30, 2019

(54) PLUG-IN LOAD BALANCING

(71) Applicant: Gibson Brands, Inc., Nashville, TN (US)

(72) Inventors: Noel Borthwick, Watertown, MA (US); Logan Thomas, Boston, MA (US)

(73) Assignee: BANDLAB (KY)

( * ) Notice: Subject to any disclaimer, the term of this patent is extended or adjusted under 35 U.S.C. 154(b) by 57 days.

(21) Appl. No.: 15/416,329

(22) Filed: Jan. 26, 2017

(65) Prior Publication Data

US 2018/0210694 A1  Jul. 26, 2018

(51) Int. Cl.
*G06F 17/00* (2006.01)
*G06F 3/16* (2006.01)

(52) U.S. Cl.
CPC .................... *G06F 3/162* (2013.01)

(58) Field of Classification Search
CPC ....................................................... G06F 3/162
See application file for complete search history.

(56) References Cited

U.S. PATENT DOCUMENTS

2010/0180224 A1* 7/2010 Willard ................ G10H 1/0025
715/773

* cited by examiner

*Primary Examiner* — Joseph Saunders, Jr.
(74) *Attorney, Agent, or Firm* — Bates & Bates, LLC

(57) ABSTRACT

A digital audio workstation software package is provided with computer readable instructions that, when executed, direct a multi-core processor to perform acts comprising accessing an audio signal. The digital audio workstation software package further includes computer-readable instructions that, when executed, direct the processor to utilize, at least in part, pipeline parallelism to enable a plurality of serially ordered plug-ins in an effects rack to process the audio signal utilizing a plurality of available processing cores to create a processed audio signal.

13 Claims, 6 Drawing Sheets

PLUG-IN LOAD BALANCING

BACKGROUND

Users of audio processing software, such as, for example, digital audio workstations (DAW's), etc., often utilize effects racks with various digital signal processing plug-ins. These plug-ins can be used to process audio signals by adding a wide variety of effects such as distortion, reverb, chorus, etc. Typically, such plug-ins are serially ordered and utilize a single CPU core, such that, for example, a distortion plug-in will distort a signal before the signal is passed to a reverb plug-in where reverb will be added, etc.

In many instances, the number of plug-ins being used, along with the processing load associated with each plug-in, can be substantial enough to cause a performance bottleneck at the single CPU core. This can include, for example, audio dropouts as the CPU core becomes overloaded.

Attempts have been made to address this issue by performing, for example, look-ahead processing. However, such approaches require audio signals to be pre-buffered, which can lead to problems including audio latency, late rendering of real-time parameter changes, etc.

SUMMARY

In an example embodiment, a computer-readable tangible medium is provided with instructions stored thereon that, when executed, direct a processor to perform acts comprising receiving an audio signal. The computer-readable tangible medium also has instructions stored thereon that, when executed, direct the processor to process the audio signal using a plurality of serially ordered plug-ins in an effects rack, wherein the processing utilizes, at least in part, pipeline parallelism to enable two or more of the plurality of serially ordered plug-ins to utilize two or more available processing cores to create a processed audio signal.

In another example embodiment, a computing device is provided with a multi-core processor. The computing device also has a computer-readable tangible medium with instructions stored thereon that, when executed, direct the multi-core processor to perform acts comprising accessing a number of available processing cores in the multi-core processor. The computer-readable tangible medium also has instructions stored thereon that, when executed, direct the processor to access an audio signal; and divide the audio signal into a plurality of segments corresponding to the number of available processing cores. The computer-readable tangible medium further includes instructions stored thereon that, when executed, direct the processor to utilize, at least in part, pipeline parallelism to enable a plurality of serially ordered plug-ins in an effects rack to process the plurality of segments utilizing the available processing cores to create a processed audio signal.

In yet another example embodiment, a digital audio workstation software package is provided with computer readable instructions that, when executed, direct a multi-core processor to perform acts comprising accessing an audio signal. The digital audio workstation software package further includes computer-readable instructions that, when executed, direct the processor to utilize, at least in part, pipeline parallelism to enable a plurality of serially ordered plug-ins in an effects rack to process the audio signal utilizing a plurality of available processing cores to create a processed audio signal.

This summary is not intended to identify key or essential features of the claimed subject matter, nor is it intended to be used as an aid in limiting the scope of the claimed subject matter.

Other features of the current disclosure will become apparent to those skilled in the art upon review of the following drawings, the detailed description, and the appended claims.

BRIEF DESCRIPTION OF THE DRAWINGS

Illustrative embodiments will be described referring to the accompanying drawings, wherein like numerals denote like elements.

DETAILED DESCRIPTION

In the following description, numerous details are set forth to provide an understanding of some embodiments of the present disclosure. However, it will be understood by those of ordinary skill in the art that the systems and/or methodologies may be practiced without these details and that numerous variations or modifications from the described embodiments may be possible.

As described herein, various techniques and technologies associated with plug-in load balancing can be used to exploit multi-core central processing unit (CPU) resources to efficiently process plug-in workloads by, for example, utilizing various concepts of parallel processing.

In one possible implementation, plug-in load balancing can result in a more balanced distribution of workloads across available processing cores, decreasing performance related dropouts in an audio engine such as might be associated with, for example, a digital audio workstation.

Example Computing Device(s)

Figure 1:
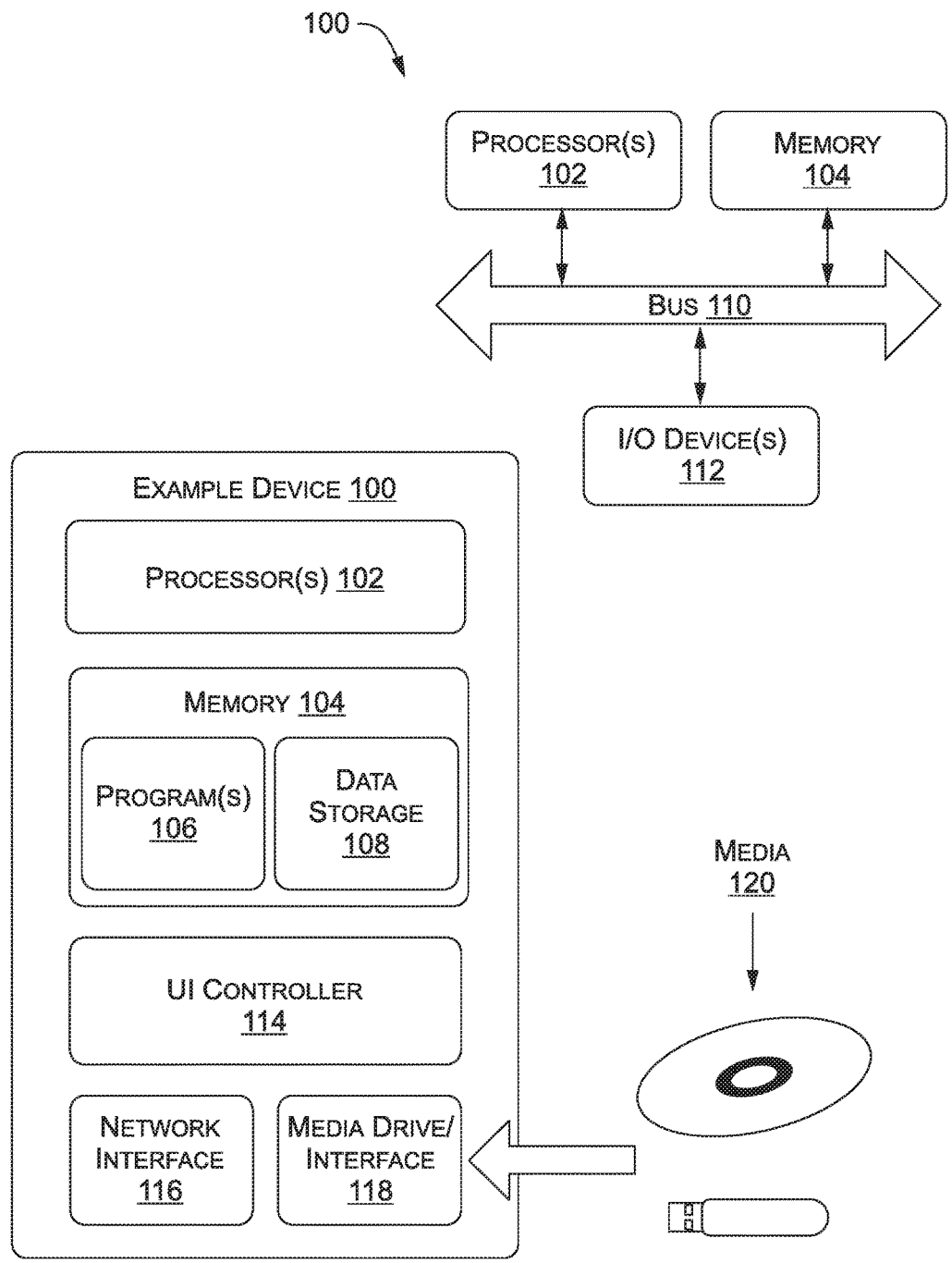
FIG. 1 illustrates an example computing device that can be used in accordance with various implementations of plug-in load balancing.

FIG. 1 illustrates an example computing device 100, with one or more processor(s) 102 (including one or more multi-core processors) and memory 104 for hosting a variety of program(s) 106, including programs configured to implement various embodiments of plug-in load balancing as discussed in this disclosure. In one possible implementation, various audio processing devices described herein may include all or portions of example computing device 100. Such audio processing devices can include anything configured to play and/or alter audio signals, such as, for example, a public address system, an audio mixing system, a workstation computer, a laptop computer, a tablet computer, a mobile phone, a speaker, one or more headphones, an entertainment system, etc.

In addition to hosting program(s) 106, memory 104 can also host data storage 108 such as, for example, one or more databases, and a variety of data discussed herein. Memory 104 can include one or more forms of volatile data storage media such as random access memory (RAM), and/or one or more forms of nonvolatile storage media (such as read-only memory (ROM), flash memory, and so forth). Further, memory 104 can be located in device 100, remote from it (such as, for example, as cloud-based memory), or any combination thereof.

Computing device 100 is one example of a computing device or programmable device, and is not intended to suggest any limitation as to scope of use or functionality of computing device 100 and/or its possible architectures. For example, computing device 100 can comprise one or more computing devices, programmable logic controllers (PLCs), etc.

Further, computing device 100 should not be interpreted as having any dependency relating to one or a combination of components illustrated in computing device 100. For example, computing device 100 may include one or more of a computer, such as a laptop computer, a desktop computer, a mainframe computer, a cell phone, an audio mixer, a musical instrument, a simple on chip computing device, etc., or any combination or accumulation thereof.

Computing device 100 can also include a bus 110 configured to allow various components and devices, such as processor(s) 102, memory 104, and data storage 108, among other components, to communicate with each other. In one possible implementation, all or portions of data storage 108 can exist within memory 104.

Bus 110 can include one or more of any of several types of bus structures, including a memory bus or memory controller, a peripheral bus, an accelerated graphics port, and a processor or local bus using any of a variety of bus architectures. Bus 110 can also include wired and/or wireless buses.

Data storage 108 can include fixed media (e.g., RAM, ROM, a fixed hard drive, etc.), removable media (e.g., a flash memory drive, a removable hard drive, optical disks, magnetic disks, and so forth), remote storage (e.g. cloud storage), or any combination or accumulation thereof.

One or more input/output (I/O) device(s) 112 may communicate via a user interface (UI) controller 114, which may connect with I/O device(s) 112 either directly or through bus 110.

In one possible implementation, a network interface 116 may communicate outside of computing device 100 via a connected network, and in some implementations may communicate with hardware, etc.

In one possible embodiment, various equipment may communicate with computing device 100 as input/output device(s) 112 via bus 110, for example.

A media drive/interface 118 can accept removable tangible media 120, such as flash drives, optical disks, removable hard drives, software products, etc. In one possible implementation, logic, computing instructions, software programs comprising elements of program(s) 106, and/or data (including, for example, audio files) may reside on removable media 120 readable by media drive/interface 118.

In one possible embodiment, input/output device(s) 112 can allow a user to enter commands and information to computing device 100, and also allow information to be presented to the user and/or other components or devices. Examples of input device(s) 112 include, for example, sensors, a keyboard, a cursor control device (e.g., a mouse), a microphone, a scanner, a musical instrument, a touch screen, and any other input devices known in the art. Examples of output devices include a display device (e.g., a monitor or projector), speakers, a printer, a network card, and so on.

Various processes of program(s) 106 may be described herein in the general context of software or program modules, and/or the techniques and modules may be implemented, all or in part, in computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can include any available data storage medium or media that is tangible and can be accessed by a computing device. Computer-readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer.

Figure 2:
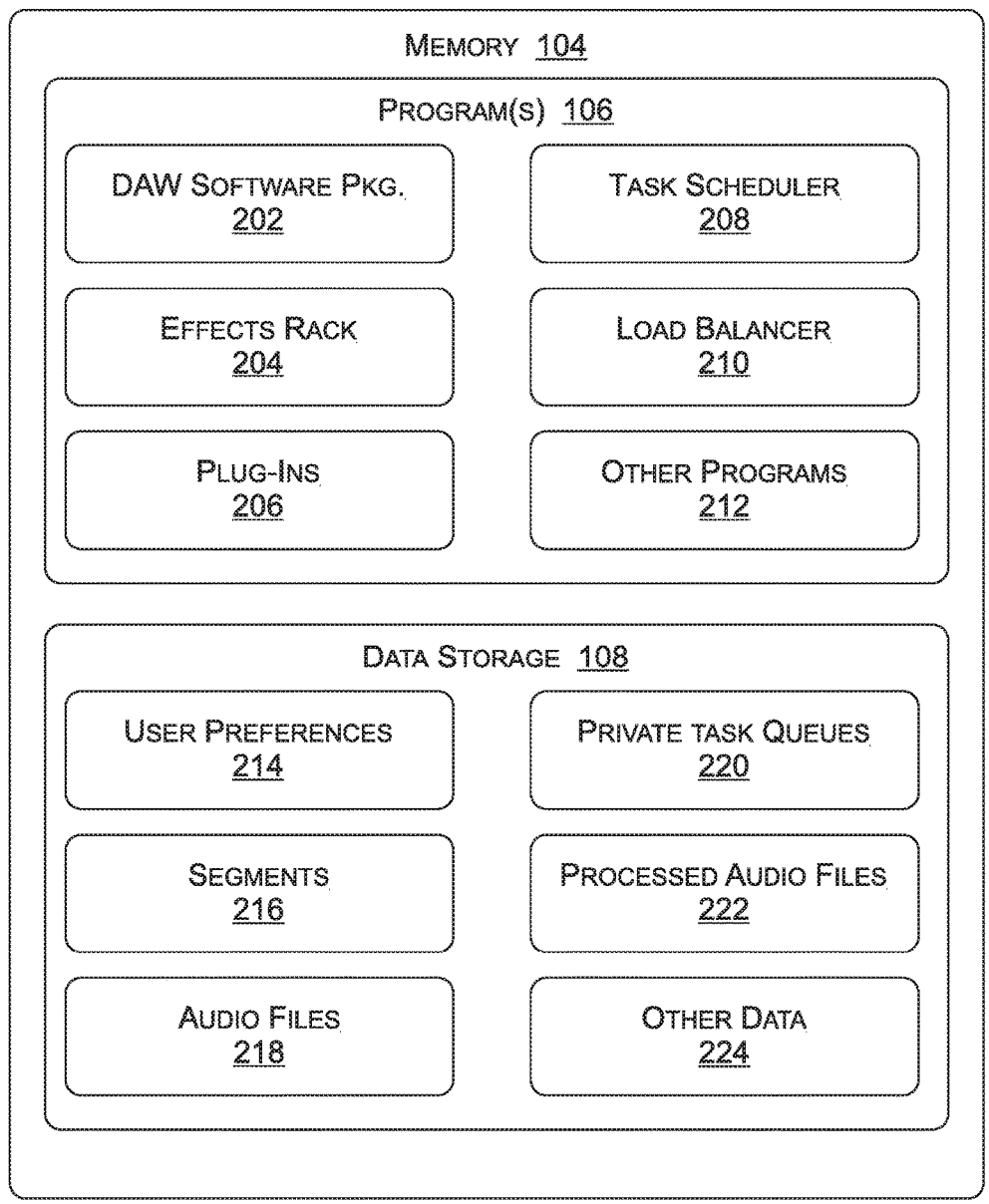
FIG. 2 illustrates example programs and data that can be used in accordance with various implementations of plug-in load balancing.

FIG. 2 illustrates an example configuration of memory 104 comprising computer-readable media including program(s) 106 and data storage 108 configured to implement various embodiments of plug-in load balancing as discussed in this disclosure. Memory 104 can provide any storage mechanisms known in the art to store various information, data and/or instructions such as program(s) 106 (including any types of software known in the art) and any other types of information and data related to operational aspects of device 100. For example, program(s) 106 stored in memory 104 can include a digital audio workstation (DAW) software package 202, an effects rack 204, a variety of plug-ins 206, a task scheduler 208, load balancer 210, and other programs 212—such as an operating system and/or assorted application programs. Program(s) 106 can be executed on processor(s) 102.

Memory 104 can also include data storage 108 on which can be stored, for example, information such as user preferences 214, segments 216, audio files 218, private task queues 220, processed audio 222, and other data 224 (including intermediate and final data created through use of one or more of program(s) 106).

Any of program(s) 106 and data in data storage 108 can reside wholly or partially on any of a variety of media types found in memory 104 and/or media 120. For example portions of DAW software package 202 can reside at different times in random access memory (RAM), read only memory (ROM), optical storage discs (such as media 120), cloud memory, optical devices, flash devices, etc. Alternately, or additionally, some or all of program(s) 106 may be implemented through use of other functionality, such as electronic circuitry, etc.

Example Techniques, Processes, Etc.

Figure 3:
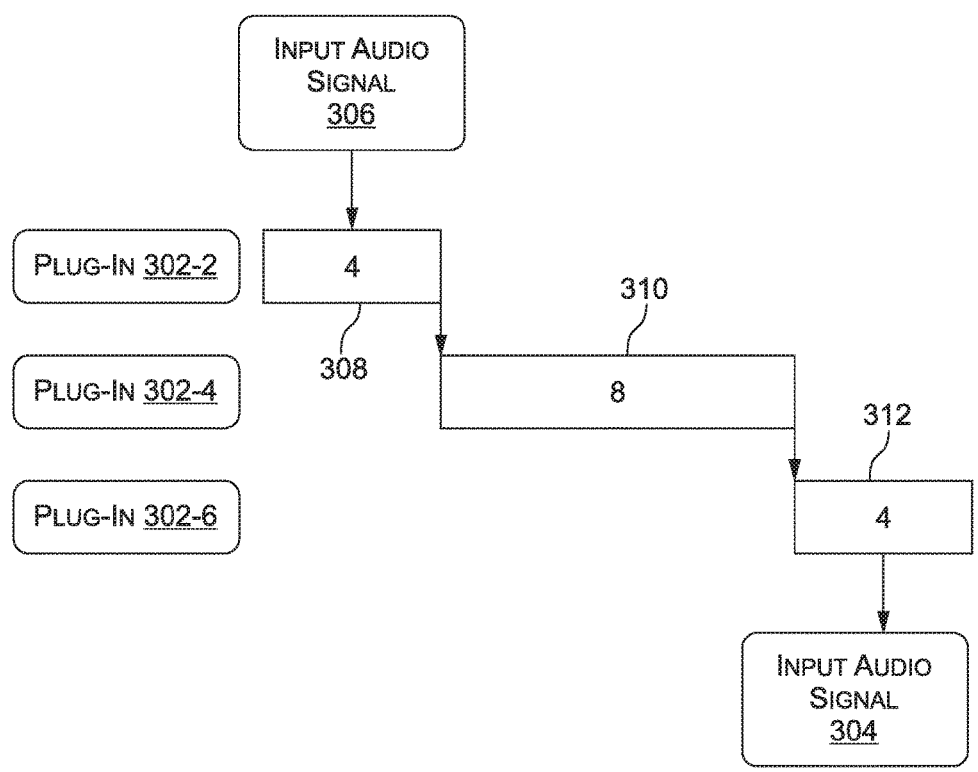
FIG. 3 illustrates an example of serial processing which can be improved through various embodiments of plug-in load balancing.

FIG. 3 illustrates an example of serial processing which can be improved through various embodiments of plug-in load balancing. As shown, three serially ordered plug-ins 302 are in place (such as, for example, in an effects rack) to produce an output audio signal 304 from an input audio signal 306. It will be understood that more or less plug-ins 302 could also be used without departing from the concepts being described herein. Plug-ins 302 can include any types of plug-ins known in the art, including for example, plug-ins for distortion, reverb, chorus, etc. Moreover, it will be understood that input audio signal 306 can include any audio data (such as an audio track, etc.).

In operation, input audio signal 306 is passed first to plug-in 302-2 where input audio signal 306 is processed by digital signal processing functionality associated with plug-in 302-2. This processing can take a given amount of time depending on the processing desired, etc. In FIG. 3, this is denoted as 4 time units 308, though any other amount of time units could also be used.

After being processed by plug-in 302-2, input audio signal 306 is further processed by digital signal processing functionality associated with plug-in 302-4. For the sake of illustration, and not limitation, it can be assumed that this processing will take, for example, 8 time units 310.

After being processed by plug-in 302-4, input audio signal 306 is further processed by digital signal processing functionality associated with plug-in 302-6. For the sake of illustration, and not limitation, it can be assumed that this processing will take, for example, 4 time units 312.

Thus, in such a serial configuration, plug-ins 302 will take 4+8+4=16 time units to process input audio signal 306 into output audio signal 304. Moreover, it will be noted that in FIG. 3 only one plug-in 302 will be in operation at any given time. For example, while plug-in 302-2 is processing input audio signal 306, plug-ins 302-4 and 302-6 are idle. Similarly, while plug-in 302-4 is processing input audio signal 306, plug-ins 302-2 and 302-6 are idle, etc. Then, while plug-in 302-6 is processing input audio signal 306, plug-ins 302-2 and 302-4 are idle. This means that plug-ins 302-6 and 302-2 are idle for a total of 12 time units each during the processing of input audio signal 306 by plug-ins 302-2, 302-4, 302-6. Stated another way for the sake of clarity, plug-ins 302-2 and 302-6 are idle 75% of the time while audio signal 306 is being processed into output audio signal 304.

Figure 4:
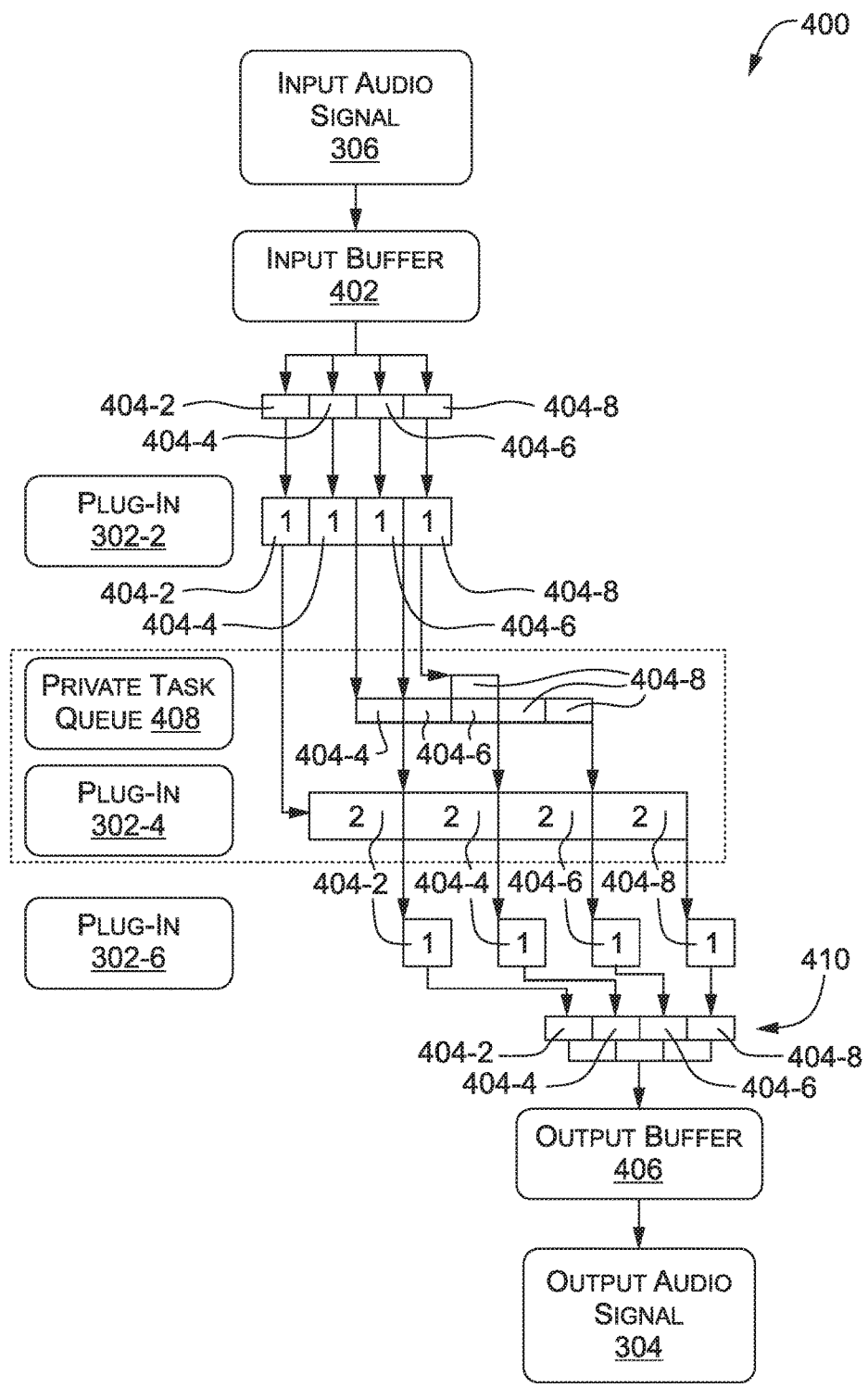
FIG. 4 illustrates an example of load balancing that can be used in accordance with various embodiments of plug-in load balancing.

FIG. 4 illustrates an example of load balancing in accordance with various embodiments of plug-in load balancing, which may be useful in decreasing idle wait times, etc., encountered at plug-ins 302 in an effects rack 400. The examples of plug-in load balancing illustrated in FIG. 4 can be accomplished through use of various implementations of parallel processing concepts (including, for example, one or more pipeline parallelism patterns at the effects rack level) known in the art in order to share a processing load of a chain of serially ordered plug-ins 302 (such as, for example, plug-ins 302 associated with effects rack 400) by distributing the processing load among available processing cores. Plug-in load balancing can include subdividing and distributing workloads associated with plug-ins 302 at an effects rack level, while retaining sequential dependencies in the flow of input audio signal 306 through plug-ins 302.

In addition to decreasing idle wait times at plug-ins 302, subdivision and distribution of workloads across available processing cores on a multi-core CPU (such as processors 102) can also decrease a risk of overloading any single CPU processing core. In one possible aspect, this can allow a user to safely increase the number of plug-ins 302 used in an effects rack.

As illustrated, a portion of input audio signal 306 is stored in an input buffer 402. The portion of input audio signal 306 is then divided into a plurality of segments 404 in a given time sequence associated with a playback order of input audio signal 306. For example, segment 404-2 comes first, followed by segment 404-4, which itself is followed by segment 404-6 and segment 404-8. In one possible implementation, the number of segments 404 can coincide with a number of available processing cores. For example, if four processing cores are available, four segments 404 can be created. Similarly, if eight processing cores are available, eight segments 404 can be created. In one possible aspect, the term segment 404, as used herein can signify a load balanced work item.

In one possible embodiment, segments 404 can be saved in a subdivided buffer before being processed by the chain of plug-ins 302 in effects rack 400.

After processing at plug-ins 302, the various segments 404 can be reassembled in the same order at an output buffer 406 to create output audio signal 304 (i.e. 404-2, followed by segment 404-4, segment 404-6 and segment 404-8).

In order to create output audio 304, segments 404 are processed, in order, by the pipeline of serially ordered plug-ins 302. For example, each segment 404 will be processed at plug-in 302-2, before being processed at plug-in 302-4, and plug-in 302-6. Moreover, by employing parallel processing concepts each plug-in 302 can potentially separate processing cores to process the various segments 404. In one possible aspect, these processing cores can change as each plug-in 302 handles new segments 404.

Also, even though three plug-ins 302 are illustrated in FIG. 4, it will be understood that more or fewer plug-ins 302 can also be used. Further, it will be understood that plug-ins 302 can include any types of plug-ins known in the art configured to process an audio signal.

In operation, a first segment 404-2 can be passed to plug-in 302-2 for processing utilizing a first processing core. A time for processing segment 404-2 at plug-in 302-2 can be given as 1 unit, such that processing all four segments 404 at plug-in 302-2 can take 4 time units.

When plug-in 302-2 is finished processing segment 404-2, it can begin processing segment 404-4, and segment 404-2 can be passed to plug-in 302-4 for further processing. In one possible implementation, plug-in 302-4 can process segment 404-2 on one processing core while plug-in 302-2 processes another segment (such as segment 404-4) using another processing core. It will be noted that the processing core used by plug-in 302-2 to process segment 404-4 may not be the same as the processing core used by plug-in 302-2 to process segment 404-2. This is because processing cores can be assigned to plug-ins 302 on a task-by-task basis based on the availably of the various processing cores.

As illustrated in FIG. 4, a time for processing of each segment 404 at plug-in 302-4 can be given as 2 units, such that processing all four segments 404 at plug-in 302-4 can take 8 time units.

In the instant case, it can be shown that plug-in 302-2 can finish processing segment 404-4 before plug-in 302-4 is finished processing segment 404-2. In such an instance, in one possible implementation, segment 404-4 can be passed to a buffer associated with plug-in 302-4, such as private task queue (PQ) 408 associated with plug-in 302-4. Segment 404-4 can sit in private task queue 408 until plug-in 302-4 is finished processing segment, 404-2. At which point, segment 404-2 can be passed to plug-in 302-6 for processing, and segment 404-4 can be accessed by plug-in 302-4 for processing.

As many or as few private task queues 408 as desired can be used in conjunction with plug-ins 302. For example, all of plug-ins 302-2, 302-4 and 302-6 can have private task queues 408 if desired. In one possible embodiment, private task queues 408 can be used to eliminate costly re-queuing of tasks when successive plug-ins 302 are busy.

As shown, plug-in 302-6 can begin processing segment 404-2 as soon as segment 404-2 is finished being processed by plug-in 302-4. As also shown, plug-in 302-6 can process segment 404-2 while plug-in 302-4 is processing segment 404-4, and plug-in 302-2 is processing segment 404-8 (plug-in 302-2 has already finished processing segment 404-6, which has been passed to private task queue 408 where it will be stored until plug-in 302-4 is free and can process it). Thus each of plug-ins 302-2, 302-4, and 302-6 can be working simultaneously, and all of plug-ins 302-2, 302-4, and 302-6 can be using different processing cores to process the various segments 404.

When plug-in 302-6 is finished processing segment 404-2, segment 404-2 can be passed to an assembly buffer 410. In a similar fashion, when plug-in 302-6 is finished with the other segments 404-4, 404-6 and 404-8, they too can be passed to assembly buffer 410 where they can be assembled in sequential order, then passed to output buffer 406 where they can form output audio signal 304.

As illustrated in FIG. 4, a time for processing of each segment 404 at plug-in 302-6 can be given as 1 unit, such that processing all four segments 404 at plug-in 302-6 can take 4 time units. However, since parallel processing allows plug-ins 302-2, 302-4, and 302-6 to be working simultaneously during the processing of segments 404, idle waiting time at plug-ins 302 can be reduced from the example given in FIG. 3 such that the plug-ins 302 in FIG. 4 can process input audio signal 306 into output audio signal 304 in 10 time units rather than the 16 time units experienced in FIG. 3.

One reason for this is that by using private task queue 408, several segments 404 can be simultaneously buffered while a plug-in 302 is busy. For example, once plug-in 302-2 is finished processing segment 404-6, because plug-in 302-4 is busy processing segment 404-4, segment 404-6 can be passed to private task queue 408, where it will be stored until plug-in 302-4 becomes free (i.e. plug-in 302-4 finishes processing segment 404-4).

Similarly, plug-in 302-2 can also finish processing segment 404-8 before plug-in 302-4 is finished processing 404-4. In such a scenario, segment 404-8 can also be passed to private task queue 408, where it will be stored with segment 404-6 until plug-in 302-4 becomes free. Then, after plug-in 302-4 is finished processing segment 404-4, segment 404-4 can be passed to plug-in 302-6 (or a private task queue associated with plug-in 302-6 if plug-in 302-6 is busy) and plug-in 302-4 can begin processing segment 404-6 while segment 404-8 waits in private task queue 408. After plug-in 302-4 is finished processing segment 404-6, segment 404-6 can be passed to plug-in 302-6 (or a private task queue associated with plug-in 302-6 if plug-in 302-6 is busy) and plug-in 302-4 can begin processing segment 404-8.

In some possible implementations, one or more task schedulers (such as, for example, thread schedulers) can be used to implement at least some of the aspects of parallel processing associated with processing input audio signal 306 into output audio signal 304 at effects rack 400. Further, the one or more task schedulers can take any form known in the art, and be used in any manner known in the art. For example, among other things, a task scheduler can be used to assign processing cores to the various plug-ins 302 as the plug-ins 302 process the various segments 404.

Figure 5:
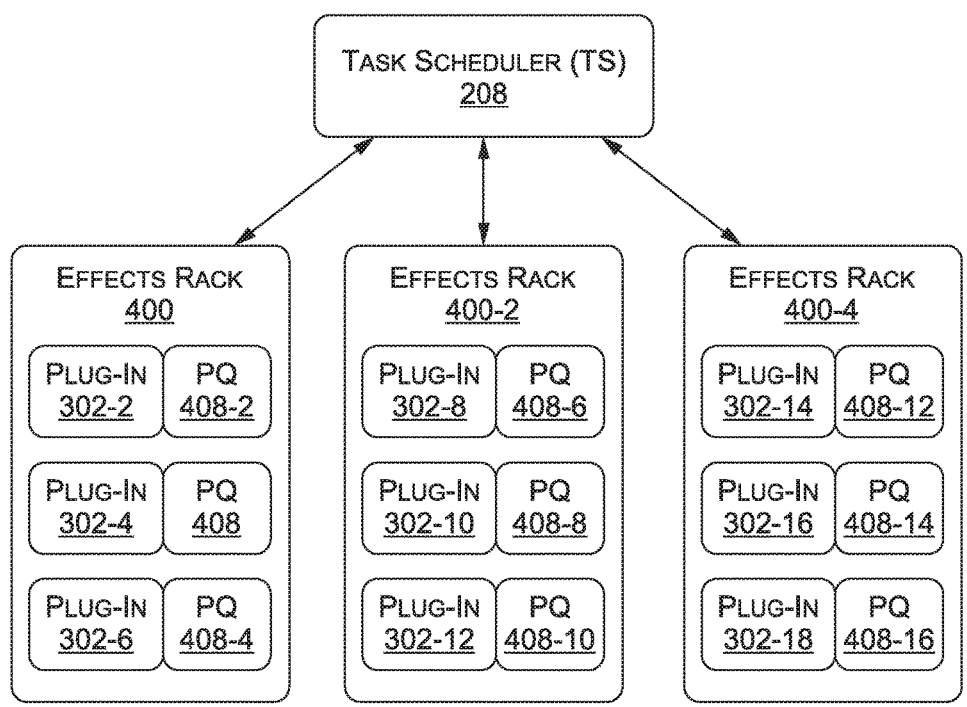
FIG. 5 illustrates an example task scheduler in accordance with various embodiments of plug-in load balancing.

FIG. 5 illustrates an example task scheduler 208 that can be used in accordance with various embodiments of plug-in load balancing. In one possible implementation, a single task scheduler 208 (such as, for example, any thread scheduler known in the art) can be used in any manner known in the art to efficiently manage operating system threads across any desired number of effects racks 400 in which pipeline tasks are being conducted. This can include prioritizing workloads within the effects racks 400 as well as handling task dependencies via queued tasks, etc. In one possible embodiment, task scheduler 208 can be used to implement at least some of the functions in the pipeline of plug-ins 302 in effects rack 400 as described in conjunction with FIG. 4.

In one possible implementation, task scheduler 208 can be used to facilitate simultaneous processing of various audio signals at the available effects racks 400 in a digital audio workstation. For example, task scheduler 208 can be used to facilitate the processing of an audio track at effects rack 400, a guitar track at effects rack 400-2, a bass guitar track at effects rack 400-4, etc.

In one possible embodiment, task scheduler 208 can be used to facilitate the load balancing of buffers (such as segments 404) of audio data in any system including serial dependencies with varying loads. One possible example can include the processing of multiple voices in a virtual instrument.

In another possible implementation, multiple task schedulers 208 maybe also used for the above purposes.

Regardless of how many task schedulers 208 are used, the elements and methods of plug-in load balancing as described herein can be employed to apply various concepts of pipeline parallelism to process any desired number of effects racks 400, which themselves can be associated with various numbers and types of plug-ins 302 having serial order dependencies. For example, implementations of plug-in load balancing can utilize one or more aspects of pipeline parallelism to implement real-time processing of multiple plug-ins 302 asynchronously across every effects rack 400 in a digital audio workstation, without incurring undesirable buffering leading to latency.

In some possible implementations, various techniques of plug-in load balancing can be adapted to a real time system resulting in low CPU overhead as might be desirable in real time processing of one or more effects racks 400. In other possible implementations, various techniques of plug-in load balancing can be used for offline processing of one or more effects racks 400.

In one possible embodiment, task scheduler 208 can be configured to manage a task queue and a thread pool for processing of parallel workloads. In one possible aspect, the thread pool can have as many worker threads as available CPU processing cores, with each worker thread being tied to a desired CPU processing core. For example, a thread pool size of four used in conjunction with four available CPU cores is illustrated in FIG. 4. It will be understood however, that larger or smaller thread pool sizes can also be used if desired based on the number of CPU cores available.

In one possible implementation, a private queue (PQ) 408 of pipeline buffers can be created for one or more of the plug-ins 302 within the one or more effects racks 400. The private queues (PQ) 408 of pipeline buffers can be utilized to handle deferred processing of a segment 404 when a plug-in 302 is busy.

For example, during pre-roll prior to playback of an audio signal (such as, for example, input audio signal 306), a pipeline of plug-ins 302, etc., for each effects rack 400 can be initialized by allocating as many pipeline buffers (such as, for example, segments 404) as desired such that:

$$PipelineBufferSize = AudioBufferSize / ThreadPoolSize$$

In one possible implementation, a minimum of two pipeline buffers may be desired for pipelining to be active, and the buffer size can be gated by a small number of samples to avoid diminishing returns due to multi-processing excessively small buffers.

In one possible aspect, effects racks 400 which are pipeline processing compatible can be established and flagged, such as, for example, by a digital audio workstation associated with effects racks 400. This can be done automatically and in real time, with effects racks 400 that are pipeline processing compatible being flagged for processing in accordance with pipeline parallelism, such as described herein, and effects racks that are not pipeline processing compatible being flagged for processing using standard buffering.

In one possible embodiment, pipeline processing compatible effects racks 400 can include, for example, effects racks 400 with two or more software plug-ins 302 and/or two or more available processing cores. In contrast, effects racks with non-software plug-ins, such as sidechain plug-ins and/or hardware DSP's, and/or effects racks 400 with less than 2 plug-ins (or less than two available processing cores), may be considered as not being pipeline processing compatible effects racks.

When one or more pipeline compatible effects racks 400 are encountered, real-time adaptive decisions can be made to determine whether to use pipeline parallelism to process the effects racks 400. In one possible aspect, such real-time adaptive decisions can be achieved, for example, by measuring rack processing metrics to determine when pipelining can be beneficial (i.e. can help avoid issues associated with overloading a CPU processing core). In instances when pipelining is found to be beneficial, input buffer 402 can be segmented into n buffer segments 404 (with n being determined during initialization).

In one possible implementation, all buffer segments 404 ($B_1$-$B_0$) through a pipeline of m plug-ins 302 in effects racks 400 ($P_1$-$P_m$) can be processed. For example, buffer segments 400 ($B_1$-$B_n$) can be processed through the first plug-in 302 in the rack $P_1$ on a main processing thread.

On completion of processing a buffer segment 404 at a plug-in 302, that segment 404 can be queued for parallel processing (via, for example, task scheduler 208) through the next plug-in 302 (P) in the pipeline.

In instances when next plug-in 302 (P) is busy processing another buffer segment 404, instead of being queued via task scheduler 208, the buffer segment 404 can be queued into the private pipeline queue 408 associated with the plug-in 302. Use of private pipeline queues 408 in this manner can prevent excessive re-queuing of tasks that aren't ready for processing.

In one possible aspect, each plug-in 302 can check its personal task queue 408 and synchronously processes it.

In one possible embodiment, while all the buffer segments 404 ($B_1$-$B_n$) are being processed through the entire pipeline of plug-ins 302 associated with an effects rack 400, queued processing tasks for each buffer segment 404 can be executed asynchronously by task scheduler 208 as it farms out the work to different queues.

After completion of processing all the segments 404 by all the plug-ins 302 in an effects rack 400, the segmented buffers 404 can be combined back into a composite buffer, such as assembly buffer 410. At such a point, plug-in parallel processing is complete for the effects rack 400 and the audio data in assembly buffer 410 can be delivered downstream.

In one possible implementation, an advanced profiling phase can exist in which profiling functionality in a digital audio workstation (DAW), can be used to determine processing loads in various plug-ins 302 and/or effects racks 400 by learning the hotspots in a digital signal processing project being run in a digital audio workstation project. The profiling functionality can then dynamically adapt the pipelining techniques used when hotspots are encountered on a project timeline associated with the project in order to avoid issues that might otherwise be encountered with overloading any single processing core.

Example Method(s)

Figure 6:
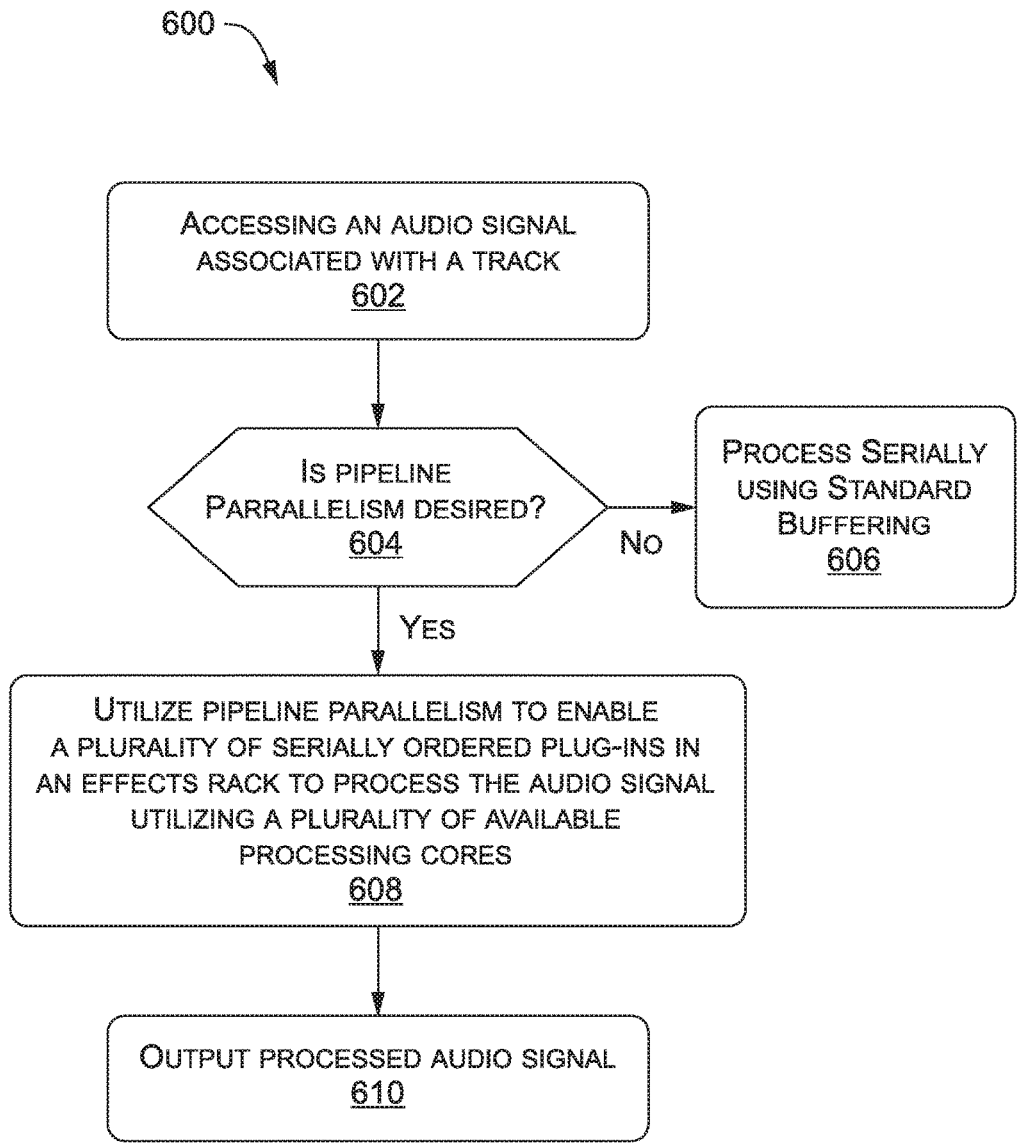
FIG. 6 illustrates example method(s) associated with various embodiments of plug-in load balancing.

FIG. 6 illustrates example method(s) 600 for implementing aspects of plug-in load balancing. The methods are illustrated as a collection of blocks and other elements in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks and/or elements may be deleted from the methods without departing from the spirit and scope of the subject matter described therein. In the context of software, the blocks and other elements can represent computer instructions that, when executed by one or more processors, perform the recited operations. Moreover, for discussion purposes, and not purposes of limitation, selected aspects of the methods may be described with reference to elements shown in FIGS. 1-5.

At block 602 an audio signal (such as input audio signal 306) is accessed. The audio signal can include any audio data that a user might wish to have processed at an effects rack, such as effects rack 400. This can include various audio tracks, such as vocal tracks, guitar tracks, bass guitar tracks, etc. In one possible implementation, the audio signal can be accessed through a digital audio workstation, and can be a recorded signal and/or a signal that is being generated live.

At block 604 the effects rack can be examined to determine if implementations of pipeline parallelism in accordance with embodiments of plug-in load balancing as described herein might be desired. Such an examination can be instigated manually or conducted automatically at any given interval, including continuously in real time.

For example, the effects rack can be viewed to ascertain whether it is pipeline processing compatible (i.e. it has two or more software plug-ins (such as plug-ins 302) and/or two or more available processing cores). If the effects rack is pipeline processing compatible, real-time adaptive decisions can be made to determine whether the use of pipeline parallelism to process the effects racks 400 might be desirable. For example, in one possible aspect, such real-time adaptive decisions can be achieved by, for example, measuring processing metrics associated with the effects rack to determine if pipelining can be beneficial (i.e. can help avoid issues associated with overloading a CPU processing core). For example, if a single processor is being used with the effects rack, the workload of the processor can be examined to see if it is at or near capacity. If so, pipeline parallelism may be desirable to reduce the risk of issues accompanying a possible overloading of the processor.

In instances where the effects rack is not pipeline processing compatible or it is determined that pipelining is not desired (i.e. not beneficial), method 604 can proceed to block 606, where processing at the effects rack can proceed using standard buffering.

In instances where pipelining is found to be beneficial, method 600 can proceed to block 608.

At block 608, implementations of pipeline parallelism can be used to enable a plurality of serially ordered plug-ins in the effects rack to process the audio signal utilizing a plurality of available processing cores. Any type of pipeline parallelism known in the art can be used, including any of the implementations described herein. For example, pipeline parallelism can be used at the effects rack level to share a processing load of a chain of serially ordered plug-ins by distributing the processing load associated with processing the audio signal among available processing cores. This can include subdividing and distributing workloads associated with the plug-ins at an effects rack level, while retaining sequential dependencies in the flow of the audio signal through the plug-ins.

In some possible implementations, one or more task schedulers (such as for example, thread schedulers) can be used to implement at least some of the aspects of pipeline parallelism associated with processing the audio signal into an output audio signal (such as output audio signal 304) at the effects rack. The one or more task schedulers can take any form known in the art, and be used in any manner known in the art.

At block 610, the output audio signal created at block 608 can be output. This can include outputting the output audio signal from the effects rack to the digital audio workstation where a user can choose to do whatever he desires with the output audio signal, including playing the output audio signal, storing the output audio signal, subjecting the output audio signal to more processing, etc.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. Moreover, embodiments may be performed in the absence of any component not explicitly described herein.

In the claims, means-plus-function clauses are intended to cover the structures described herein as performing the recited function and not just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard engineering techniques.

ILLUSTRATIVE EMBODIMENTS

The following embodiments are illustrative and are not intended to limit the scope of the disclosed subject matter.

Embodiment 1

A computer-readable tangible medium with instructions stored thereon that, when executed, direct a processor to perform acts comprising:
receiving an audio signal; and
processing the audio signal using a plurality of serially ordered plug-ins in an effects rack, wherein the processing utilizes, at least in part, pipeline parallelism to enable two or more of the plurality of serially ordered plug-ins to utilize two or more available processing cores to create a processed audio signal.

Embodiment 2

The computer-readable medium of embodiment 1, further including instructions to direct a processor to perform acts comprising:
accessing a plurality of settings associated with the plurality of serially ordered plug-ins in the effects rack by receiving user input regarding available settings associated with the plurality of serially ordered plug-ins.

Embodiment 3

The computer-readable medium of embodiment 1, further including instructions to direct a processor to perform acts comprising:
dividing the audio signal into a plurality of segments corresponding to a number of available processing cores.

Embodiment 4

The computer-readable medium of embodiment 3, further including instructions to direct a processor to perform acts comprising:
reassembling the plurality of segments to create the processed audio signal after the plurality of segments have been processed by the plurality of serially ordered plug-ins.

Embodiment 5

The computer-readable medium of embodiment 1, further including instructions to direct a processor to perform acts comprising:
enabling the two or more of the plurality of serially ordered plug-ins to utilize the two or more available processing cores to create the processed audio signal by utilizing pipeline parallelism at an effects rack level.

Embodiment 6

The computer-readable medium of embodiment 1, further including instructions to direct a processor to perform acts comprising:
utilizing a task scheduler to enable the two or more of the plurality of serially ordered plug-ins to utilize the two or more available processing cores to create the processed signal.

Embodiment 7

The computer-readable medium of embodiment 6, further including instructions to direct a processor to perform acts comprising:

utilizing one or more private task queues associated with the plurality of serially ordered plug-ins to prevent a re-queuing of tasks by the task scheduler when any of the plurality of serially ordered plug-ins are busy.

Embodiment 8

A computing device comprising:
a multi-core processor; and
a computer-readable tangible medium with instructions stored thereon that, when executed, direct the multi-core processor to perform acts comprising:
   accessing a number of available processing cores in the multi-core processor;
   accessing an audio signal;
   dividing the audio signal into a plurality of segments corresponding to the number of available processing cores; and
   utilizing, at least in part, pipeline parallelism to enable a plurality of serially ordered plug-ins in an effects rack to process the plurality of segments utilizing the available processing cores to create a processed audio signal.

Embodiment 9

The computing device of embodiment 8, wherein the computer-readable medium further includes instructions to direct the one or more processors to perform acts comprising:
   accessing the number of available processing cores by ascertaining a number of processing cores on the computing device available for use.

Embodiment 10

The computing device of embodiment 8, wherein the computer-readable medium further includes instructions to direct the one or more processors to perform acts comprising:
   reassembling the plurality of segments to create the processed audio signal after the plurality of segments have been processed by the plurality of serially ordered plug-ins.

Embodiment 11

The computing device of embodiment 8, wherein the computer-readable medium further includes instructions to direct the one or more processors to perform acts comprising:
   utilizing a task scheduler to assign available processing cores to the plurality of serially ordered plug-ins.

Embodiment 12

The computing device of embodiment 11, wherein the computer-readable medium further includes instructions to direct the one or more processors to perform acts comprising:
   utilizing one or more private task queues associated with the plurality of serially ordered plug-ins to prevent a re-queuing of tasks by the task scheduler when any of the plurality of serially ordered plug-ins are busy.

Embodiment 13

The computing device of embodiment 11, wherein the computing device comprises one or more of:

a digital audio workstation;
a personal computer;
a tablet;
a mobile phone;
a laptop.

Embodiment 14

A digital audio workstation software package comprising computer readable instructions that, when executed, direct a multi-core processor to perform acts comprising:
   accessing an audio signal; and
   utilizing, at least in part, pipeline parallelism to enable a plurality of serially ordered plug-ins in an effects rack to process the audio signal utilizing a plurality of available processing cores to create a processed audio signal.

Embodiment 15

The digital audio workstation software package of embodiment 14, wherein the computer-readable medium further includes instructions to direct the one or more processors to perform acts comprising:
   processing the plurality of segments using a plurality of settings associated with the plurality of serially ordered plug-ins in the effects rack.

Embodiment 16

The digital audio workstation software package of embodiment 14, wherein the computer-readable medium further includes instructions to direct the one or more processors to perform acts comprising:
   dividing the audio signal into a plurality of segments corresponding to a number of available processing cores.

Embodiment 17

The digital audio workstation software package of embodiment 14, wherein the audio device comprises one or more of:
   reassembling the plurality of segments to create the processed audio signal after the plurality of segments have been processed by the plurality of serially ordered plug-ins.

Embodiment 18

The digital audio workstation software package of embodiment 14, wherein the computer-readable medium further includes instructions to direct the one or more processors to perform acts comprising:
   enabling the plurality of serially ordered plug-ins in the effects rack to process the audio signal utilizing the plurality of available processing cores to create the processed audio signal by utilizing pipeline parallelism at an effects rack level.

Embodiment 19

The digital audio workstation software package of embodiment 18, wherein the computer-readable medium further includes instructions to direct the one or more processors to perform acts comprising:

utilizing a task scheduler to enable the plurality of serially ordered plug-ins in the effects rack to process the audio signal utilizing the plurality of available processing cores to create the processed audio signal.

Embodiment 20

The digital audio workstation software package of embodiment 19, wherein the computer-readable medium further includes instructions to direct the one or more processors to perform acts comprising:
utilizing one or more private task queues associated with the plurality of serially ordered plug-ins to prevent a re-queuing of tasks by the task scheduler when any of the plurality of serially ordered plug-ins are busy.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A non-transitory computer-readable tangible medium with instructions stored thereon that, when executed, direct a processor to perform acts comprising:
   receiving an audio signal;
   processing the audio signal using a plurality of serially ordered plug-ins in an effects rack, wherein the processing utilizes, at least in part, pipeline parallelism to enable two or more of the plurality of serially ordered plug-ins to utilize two or more available processing cores to create a processed audio signal;
   utilizing a task scheduler to enable the two or more of the plurality of serially ordered plug-ins to utilize the two or more available processing cores to create the processed audio signal; and
   utilizing one or more private task queues associated with the plurality of serially ordered plug-ins to prevent a re-queuing of tasks by the task scheduler when any of the plurality of serially ordered plug-ins are busy.

2. The non-transitory computer-readable tangible medium of claim 1, further including instructions to direct a processor to perform acts comprising:
   accessing a plurality of settings associated with the plurality of serially ordered plug-ins in the effects rack by receiving user input regarding available settings associated with the plurality of serially ordered plug-ins.

3. The non-transitory computer-readable tangible medium of claim 1, further including instructions to direct a processor to perform acts comprising:
   dividing the audio signal into a plurality of segments corresponding to a number of available processing cores.

4. The non-transitory computer-readable tangible medium of claim 3, further including instructions to direct a processor to perform acts comprising:
   reassembling the plurality of segments to create the processed audio signal after the plurality of segments have been processed by the plurality of serially ordered plug-ins.

5. The non-transitory computer-readable tangible medium of claim 1, further including instructions to direct a processor to perform acts comprising:
   enabling the two or more of the plurality of serially ordered plug-ins to utilize the two or more available processing cores to create the processed audio signal by utilizing pipeline parallelism at an effects rack level.

6. A computing device comprising:
   a multi-core processor; and
   a non-transitory computer-readable tangible medium with instructions stored thereon that, when executed, direct the multi-core processor to perform acts comprising:
      accessing a number of available processing cores in the multi-core processor;
      accessing an audio signal;
      dividing the audio signal into a plurality of segments corresponding to the number of available processing cores;
      utilizing, at least in part, pipeline parallelism to enable a plurality of serially ordered plug-ins in an effects rack to process the plurality of segments utilizing the available processing cores to create a processed audio signal;
      utilizing a task scheduler to assign available processing cores to the plurality of serially ordered plug-ins; and
      utilizing one or more private task queues associated with the plurality of serially ordered plug-ins to prevent a re-queuing of tasks by the task scheduler when any of the plurality of serially ordered plug-ins are busy.

7. The computing device of claim 6, wherein the non-transitory computer-readable tangible medium further includes instructions to direct the multi-core processor to perform acts comprising:
   accessing the number of available processing cores by ascertaining a number of processing cores on the computing device available for use.

8. The computing device of claim 6, wherein the non-transitory computer-readable tangible medium further includes instructions to direct the multi-core processor to perform acts comprising:
   reassembling the plurality of segments to create the processed audio signal after the plurality of segments have been processed by the plurality of serially ordered plug-ins.

9. The computing device of claim 6, wherein the computing device comprises one or more of:
   a digital audio workstation;
   a personal computer;
   a tablet;
   a mobile phone;
   a laptop.

10. A digital audio workstation software package stored on a non-transitory computer-readable tangible medium comprising computer readable instructions that, when executed, direct a multi-core processor to perform acts comprising:
    accessing an audio signal;
    utilizing, at least in part, pipeline parallelism at an effects rack level to enable a plurality of serially ordered plug-ins in an effects rack to process the audio signal utilizing a plurality of available processing cores to create a processed audio signal;

utilizing a task scheduler to enable the plurality of serially ordered plug-ins in the effects rack to process the audio signal utilizing the plurality of available processing cores to create the processed audio signal; and utilizing one or more private task queues associated with the plurality of serially ordered plug-ins to prevent a re-queuing of tasks by the task scheduler when any of the plurality of serially ordered plug-ins are busy.

11. The digital audio workstation software package stored on the non-transitory computer-readable tangible medium of claim 10, wherein the computer-readable instructions further include instructions to direct the multi-core processor to perform acts comprising:

processing the audio signal using a plurality of settings associated with the plurality of serially ordered plug-ins in the effects rack.

12. The digital audio workstation software package stored on the non-transitory computer-readable tangible medium of claim 10, wherein the computer-readable instructions further include instructions to direct the multi-core processor to perform acts comprising:

dividing the audio signal into a plurality of segments corresponding to a number of available processing cores.

13. The digital audio workstation software package stored on the non-transitory computer-readable tangible medium of claim 12, wherein the computer-readable instructions further include instructions to direct the multi-core processor to perform acts comprising:

reassembling the plurality of segments to create the processed audio signal after the plurality of segments have been processed by the plurality of serially ordered plug-ins.

\* \* \* \* \*